3,328,160
METALLURGICAL LINING SLAG
Nicholas A. Boukidis, Evanston, Ill., assignor to Dynamic Industrials, Inc.
No Drawing. Filed Oct. 23, 1964, Ser. No. 406,174
5 Claims. (Cl. 71—62)

This application is a continuation-in-part of my copending application Ser. No. 12,271, filed Mar. 2, 1960, now abandoned.

This invention relates to additives for amending and enriching soil and to methods of making the same. It particuluarly relates to a treated blast furnace slag having unique resistance to powdering, lumping and agglomeration with highly desirable qualities as a carrier for trace elements useful in promoting healthy soil conditions and as a base material for a fertilizer containing all the known nutritional elements for plant feeding.

Metallurgical slag, such as blast furnace slags, have in the past been used as liming and fertilizer materials. Certain basic metallurgical slags such as blast furnace slag have highly desirable properties for soil sweetening and acid neutralizing as well as soil conditioning properties. In large measure blast furnace slags have the undesirable properties of agglomerating on storage and forming hard relatively large lumps which are difficult to reduce. In this form, unless crushed, slag has relatively little use either as a soil conditioner or as a soil sweetener. To some extent these slags also tend to form a fine powder, particularly after the lumps are reduced in size. Unless watered down, they create undesirable dust effects upon spreading, particularly if there is any wind involved.

I have discovered methods of treating basic metallurgical slags, such as blast furnace slag which eliminates these undesirable properties of agglomeration and powdering. I may at the same time incorporate fertilizing elements and highly desirable trace minerals into the product to produce a highly useful new product.

I have discovered that basic metallurgical slags, such as blast furnace slag, when treated with about 1% to 3% nitrogen in the form of any nutrient salt presently used for plant fertilization either alone or admixed with other nutrient salts of phosphorus and potassium as, for example, a mixture of components of ammonia, phosphoric acid and potassium will substantially reduce powdering and will not aggregate in storage substantially irrespective of the length of time stored.

The process of this invention and the soil amending compositions resulting therefrom can perhaps best be understood by referring to the following examples of certain preferred practices of this invention.

Applicant's following examples describe the use of blast furnace slag. Other types of liming metallurgical slags are equally benefited by applicant's treatment and selection of the type of blast furnace slag for the following example is not intended in any way to limit the scope of applicant's invention.

Applicant prefers to use water-quenched slag as opposed to air cooled slag because it eliminates the breaking up or crushing operation necessary with air cooled slag and because it combines better with the ingredients added in applicant's process and also because it breaks down in the soil more readily than does air cooled slag.

Analysis of suitable blast furnace slags for applicant's purposes fall into the following approximate range:

| | Percent (about) |
|---|---|
| Silica ($SiO_2$) | 33–42 |
| Alumina ($Al_2O_3$) | 10–16 |
| Lime (CaO) | 36–45 |
| Magnesia (MgO) | 3–14 |
| Sulfur (S) | 1–3 |
| Iron oxide (FeO) | 0.3–2 |
| Manganese oxide (MnO) | 0.2–1.5 |

Applicant takes blast furnace slag and screens or otherwise reduces it to a particle size within the standard prescribed by the United States Department of Agriculture for "agricultural ground" grade. The method of reduction to proper particle size is immaterial but for example, slag screened to a mesh size whereby 83% passes through a number 20 United States standard mesh and 31% passes through a number 60 United States standard mesh would meet said "agricultural ground" standard. The above described water-quenched "agricultural ground" slag is an ideal base material for my invention and in the examples references to prepared slag are intended to indicate slag falling within the approximate ranges and standard just described.

The first example of my invention is directed to fertilizer compositions primarily intended for use as a liming material, i.e., a soil sweetener useful in correcting acid type soils so prevalent in areas of high average rainfall.

Where such a liming material is desired, applicant mixes the prepared slag with a nitrogen, phosphorous, potassium, sometimes referred to as NPK, fertilizer material in such amounts as to yield a 1–2–2 formulation of NPK in the finished product. For example, a fertilizer made up of ammonium sulphate, triple superphosphate or superphosphate, and muriate of potash, combined in appropriate amounts to yield a 10–20–20 formulation of NPK fertilizer, would be mixed with the prepared slag in a ratio of 90 parts slag to 10 parts fertilizer to yield 1–2–2 formulation of NPK in the final mixed aggregate.

The aggregate thus prepared is an excellent liming material that has all the benefits of ordinary limestone materials plus the additional benefits of non-agglomeration or powdering during storage for periods as long as a year or more. Similar elimination of agglomeration may be achieved by adding 1% to 3% of nitrogen by weight as urea, ammonium phosphate, ammonium sulphate, ammonium nitrate or any similar nutrient salt of nitrogen.

The mixing of the materials, which is essentially a dry mixing or perhaps damp at most, may be accomplished in any manner suitable to thoroughly mix the aggregate and for example, may be accomplished in a concrete mixer.

Additional benefits are readily apparent in that the NPK component adds nourishment to the soil and further, since it is in a sufficiently small amount percentagewise to the total aggregate, the ordinary "burning" effect is minimized to the point of insignificance when applying my liming material, whereby my liming material may be applied to soil during any season of the year, even during mid summer, without danger of "burning" growth thereon. This material is especially useful for direct application on lawns and in top dressing of crops where "burning" is a serious problem.

I have discovered that if the nitrogen components of the fertilizer amounts to less than 1% [e.g.'s 1–1–1 NPK component, 1–2–0 NPK component, 2–1–0 NPK component] of the final aggregate, the material will revert to its agglomerating and powdering tendencies. Further, where the total plant nutrients, nitrogen, phosphorous and potassium are permitted to exceed 10% of the final aggregate, the "burning" characteristics of ordinary fertilizers will begin to reappear unless spreading rates are carefully controlled. Applicant recommends a 3% to 5% mixture of plant nutrients having not less than 1% nitrogen—such as that described in my foregoing example—as a very desirable ratio based on applicant's own experimentation.

The invention can perhaps best be understood by reference to the following examples.

Example 1

A water cooled blast furnace slag was divided into two portions. One portion was bagged in 80 lb. bags without any additions. The other portion was admixed with sufficient urea to add 1% of nitrogen by weight and bagged in 80 lb. bags. The bags were then placed under compression of about 500 lbs. to simulate the condition which exists in stacking such bags in storage. The bags were periodically inspected. After about two weeks of such storage the untreated slag had hardened and agglomerated and after two months was a hardened useless mass. The treated bags remained unagglomerated for more than a year, and at that time were still free flowing and free of lumps.

Example 2

Another portion of the blast furnace slag of Example 1 was divided into two portions, one untreated and the other to which was admixed sufficient ammonium phosphate to provide about 1.5% nitrogen by weight. Both portions were bagged in 80 lb. bags and subjected to load as in Example 1. The untreated slag hardened in about two weeks into agglomerates while the treated slag remained unagglomerated for more than a year and at that time were still free flowing and free of lumps.

Example 3

A third portion of the blast furnace slag of Example 1 was treated with an amount of ammonium sulfate to provide 2% of nitrogen by weight, sufficient potassium chloride to provide 1% potassium and sufficient superphosphate to provide 1% phosphate on the slag. The mixture was bagged and loaded as in Example 1. After 18 months the treated slag was free flowing and unagglomerated.

Example 4

A fourth portion of the blast furnace slag of Example 1 was admixed with sufficient urea formaldehyde to provide 1.35% by weight nitrogen. The mixture was bagged, loaded as in Example 1 and periodically checked. The slag remained unagglomerated for more than a year with complete free flowing capabilities.

Example 5

A fifth portion of the blast furnace slag of Example 1 was treated with ammonium nitrate sufficient to incorporate 2% by weight of nitrogen into the slag. When bagged and loaded as in Example 1, the treated slag remained free flowing for more than a year without any sign of agglomeration.

Portions of blast furnace slag treated with amounts of nitrogen containing compounds providing less than 1% by weight of nitrogen retarded agglomeration to some degree but were unsatisfactory for prolonged storage. For example, slag treated with an amount of ammonium nitrate sufficient to provide 0.75% nitrogen begin to agglomerate after about two months and were severely hardened in less than six months. Such material could not be used in conventional form fertilizer feeds without recrushing.

Amounts of nitrogen containing compounds in excess of 3% by weight on the slag do not appear to add any additional effectiveness to the non-agglomerating characteristics of the mixture but appear to be merely surplusage.

In the foregoing specification I have set out certain preferred practices of my invention, however it will be recognized that this invention may be otherwise embodied within the scope of the following claims.

I claim:

1. A non-agglomerating, non-powdering agricultural liming material consisting essentially of agricultural ground liming metallurgical slag admixed with an amount of urea formaldehyde sufficient to provide about 1% to about 3% nitrogen by weight on the slag.

2. A non-agglomerating, non-powdering agricultural liming material consisting essentially of agricultural ground liming metallurgical slag admixed with an amount of ammonium phosphate sufficient to provide about 1% to about 3% nitrogen by weight on the slag.

3. A non-agglomerating, non-powdering agricultural liming material consisting essentially of agricultural ground liming metallurgical slag admixed with an amount of ammonium chloride sufficient to provide about 1% to about 3% nitrogen by weight on the slag.

4. A non-agglomerating, non-powdering agricultural liming material consisting essentially of agricultural ground liming metallurgical slag admixed with an amount of ammonium sulfate sufficient to provide about 1% to about 3% nitrogen by weight on the slag.

5. A non-agglomerating, non-powdering agricultural liming material consisting essentially of agricultural ground liming metallurgical slag admixed with an amount of ammonium nitrate sufficient to provide about 1% to about 3% nitrogen by weight on the slag.

References Cited

UNITED STATES PATENTS

| | | | |
|---|---|---|---|
| 2,903,349 | 9/1959 | Bryant | 71—62 |
| 2,927,851 | 3/1960 | Wilson | 71—62 |

DONALL H. SYLVESTER, *Primary Examiner.*

ANTHONY SCIAMANNA, *Examiner.*

G. W. RUTHERFORD, *Assistant Examiner.*